US012582220B2

(12) United States Patent
Wilson

(10) Patent No.: US 12,582,220 B2
(45) Date of Patent: Mar. 24, 2026

(54) PIVOTING SLEEVER BAR HOLDER

(71) Applicant: Klein Tools, Inc., Lincolnshire, IL (US)

(72) Inventor: Shane Matthew Wilson, Waxahachie, TX (US)

(73) Assignee: Klein Tools, Inc, Lincolnshire, IL (US)

(*) Notice: Subject to any disclaimer, the term of this patent is extended or adjusted under 35 U.S.C. 154(b) by 149 days.

(21) Appl. No.: 18/216,872

(22) Filed: Jun. 30, 2023

(65) Prior Publication Data

US 2025/0000247 A1 Jan. 2, 2025

(51) Int. Cl.

*A45F 5/02* (2006.01)
*A45F 5/00* (2006.01)
*B25H 3/00* (2006.01)

(52) U.S. Cl.

CPC ............ *A45F 5/021* (2013.01); *B25H 3/006* (2013.01); *A45F 5/1575* (2025.01)

(58) Field of Classification Search

CPC .. A45F 5/021; A45F 5/1575; A45F 2005/025; E05C 19/028; E05C 1/00; E05C 19/04; E05B 15/108; E05B 63/18; E05B 15/006; E05B 17/2011; B25H 3/006

USPC ......... 248/514, 520–521, 538; 224/904, 242, 224/197–200; 24/580.1; 403/84, 132, 403/135, 83, 92–93

See application file for complete search history.

(56) References Cited

U.S. PATENT DOCUMENTS

| | | | | | |
|---|---|---|---|---|---|
| 2,628,054 | A * | 2/1953 | Fazakerley | B60N 3/103 | 211/74 |
| 2,759,620 | A * | 8/1956 | Pharris | B44D 3/126 | 217/60 B |
| 3,610,487 | A * | 10/1971 | Campos | F41C 33/0227 | 224/198 |
| 3,734,439 | A * | 5/1973 | Wintz | A47G 23/0241 | 248/230.8 |
| 3,802,112 | A * | 4/1974 | Banner | A01K 97/10 | 248/514 |
| 4,106,679 | A * | 8/1978 | Hillinger | A45F 5/00 | 224/197 |
| 4,638,530 | A * | 1/1987 | Perry | A45F 5/021 | 24/3.12 |
| 5,068,996 | A * | 12/1991 | Shank | A01K 97/10 | 248/538 |
| 5,143,468 | A * | 9/1992 | Pausch | F16M 11/12 | 16/322 |
| 5,195,667 | A * | 3/1993 | Gallant | A45F 5/02 | 224/904 |
| 5,274,885 | A * | 1/1994 | Hellweg | A45F 5/02 | 24/3.12 |
| 5,839,630 | A * | 11/1998 | Dunstan | F41C 33/02 | 224/675 |

(Continued)

*Primary Examiner* — Ingrid M Weinhold

(57) ABSTRACT

A tool mount for use with a sleever bar includes a locking handle moveable between a secured position and a locked position. The tool mount further includes a positioning wheel aligned adjacent to the locking handle. The positioning wheel may be configured to engage the locking handle when the locking handle is in the locked position, and rotate freely relative to the locking handle when the locking handle is in the secured position. The tool mount further includes a tool holder coupled to the positioning wheel and configured to receive the sleever bar, wherein the tool holder rotates freely with the positioning wheel when the locking handle is in the secured position.

16 Claims, 10 Drawing Sheets

(56) References Cited

U.S. PATENT DOCUMENTS

| | | | | | |
|---|---|---|---|---|---|
| 6,102,264 | A * | 8/2000 | Redzisz | B25H 3/006 224/904 |
| 6,161,741 | A * | 12/2000 | French | F41C 33/0227 224/198 |
| 6,685,067 | B2 * | 2/2004 | French | F41C 33/0227 224/198 |
| 6,817,499 | B2 * | 11/2004 | Martinez | B26B 29/025 224/232 |
| 6,889,878 | B2 * | 5/2005 | Parsons | A45F 5/02 224/678 |
| 8,100,304 | B2 * | 1/2012 | Tanzini | F41C 33/045 224/200 |
| 8,251,266 | B2 * | 8/2012 | Gregory | F41C 33/045 224/198 |
| 8,490,845 | B2 * | 7/2013 | Stewart | B25H 3/006 224/904 |
| 8,777,077 | B2 * | 7/2014 | McClain | A45F 5/021 224/676 |
| 8,783,532 | B2 * | 7/2014 | Gregory | F41C 33/045 224/198 |
| 9,797,679 | B2 * | 10/2017 | Ponder | F41C 33/001 |
| 10,207,397 | B1 * | 2/2019 | Troutman | B25B 27/16 |
| 10,712,127 | B2 * | 7/2020 | Tedder | A45F 5/021 |
| 10,782,094 | B2 * | 9/2020 | Rogers | F41C 33/045 |
| 10,883,795 | B2 * | 1/2021 | Rogers | F41C 33/045 |
| 11,143,487 | B1 * | 10/2021 | Reich | F41C 33/0263 |
| 2003/0089750 | A1 * | 5/2003 | Martinez | B26B 29/025 224/232 |
| 2006/0196903 | A1 * | 9/2006 | Tanzini | F41C 33/045 224/200 |
| 2007/0023468 | A1 * | 2/2007 | Ford | F41C 33/045 224/198 |
| 2007/0170220 | A1 * | 7/2007 | Fragassi, III | B25H 3/006 224/660 |
| 2007/0215657 | A1 * | 9/2007 | Stewart | A45F 5/02 224/904 |
| 2008/0203124 | A1 * | 8/2008 | Gorings | A45F 5/021 224/242 |
| 2010/0133305 | A1 * | 6/2010 | Stewart | B25H 3/006 224/671 |
| 2012/0152997 | A1 * | 6/2012 | McClain | A45F 5/021 224/676 |
| 2013/0284774 | A1 * | 10/2013 | Stewart | B25H 3/006 224/197 |
| 2013/0306690 | A1 * | 11/2013 | Vuckov | A45C 11/00 224/242 |
| 2019/0219359 | A1 * | 7/2019 | Rogers | F41C 33/043 |

* cited by examiner

PIVOTING SLEEVER BAR HOLDER

BACKGROUND

Tool holders often reflect a compromise between securely engaging a tool and providing flexibility of motion for use in a typical working environment. In one configuration, the tool holder which is carried on the body of a user, includes a leather belt strap coupled to a steel pigtail sized to accept the tool. In this configuration, the tool and pigtail may rotate freely relative to the leather belt strap and are not secured relative to each other. In another configuration, the tool holder includes a leather belt strap coupled to an angled holder sized to receive and secure the tool in a fixed position relative to the leather belt strap. Depending on the physical characteristics of the tool to be secured, the conditions of the working environment, tool holders may be focused on the retention and security of the tool at the expense of user comfort.

SUMMARY

The following are example embodiments of methods and devices that could be claimed in this disclosure.

In an example embodiment, a tool mount for use with a sleever bar is disclosed. The example tool mount includes a locking handle moveable between a secured position and a locked position, and a positioning wheel including a plurality of engagement features aligned adjacent to the locking handle. The example positioning wheel is configured to engage the locking handle when the locking handle is in the locked position, and rotate freely relative to the locking handle when the locking handle is in the secured position. The example tool mount further includes a tool holder coupled to the positioning wheel and configured to receive the sleever bar, wherein the tool holder rotates freely with the positioning wheel when the locking handle is in the secured position.

In another example embodiment, the locking handle includes a pair of locking tabs.

In another example embodiment, wherein the locking handle includes a retention assembly.

In another example embodiment, the retention assembly includes at least one ball detent.

In another example embodiment, the at least one ball detent of the retention assembly is aligned with a corresponding stop formed into a mounting plate.

In another example embodiment, the corresponding stop includes a first stop formed in the mounting plate and a second stop formed in the mounting plate.

In another example embodiment, the at least one ball detent is located adjacent to the first stop corresponding to the positioning wheel in the locked position.

In another example embodiment, the second stop reflects the secured position corresponding to the positioning wheel being allowed to rotate freely about a centerline.

In another example embodiment, the tool holder is fixedly coupled to the positioning wheel.

In another example embodiment, the tool holder is removably coupled to the positioning wheel.

In another example embodiment, the tool holder includes a pigtail.

In another example embodiment, the positioning wheel includes a plurality of engagement features sized to accept a pair of locking tabs.

In another example embodiment, the positioning wheel aligned adjacent to the locking handle is fixedly coupled to a mounting plate.

In another example embodiment, the mounting plate is a belt mounting plate.

In another example embodiment, a centerline of rotation of the positioning wheel is aligned with a travel path defined between the secured position and the locked position.

In another example embodiment, a method for securing a sleever bar is disclosed. The example method includes receiving the sleever bar within a pigtail of a tool holder, wherein the tool holder is fixedly secured to a rotatable positioning wheel including a plurality of engagement features, and wherein the tool holder and positioning wheel are rotatable about a centerline, and translating a locking handle to a locked location. The example step of translating includes engaging a stop at the locked location to secure the locking handle in the locked location, and engaging a pair of locking tabs formed as part of the secured locking handle with two of the plurality of engagement features provided by the positioning wheel, wherein the pair of locking tabs and the stop cooperate to retain the positioning wheel and tool holder in a fixed position. The example method further includes translating the locking handle to a secured location wherein the pair of locking tabs are disengaged from the locking wheel along free rotation.

In another example embodiment, engaging a stop includes engaging the stop with a ball detent.

In another example embodiment, engaging the pair of locking tabs includes providing a relief on each of the locking tabs, wherein the relief corresponds to the plurality of engagement features.

In another example embodiment, the tool holder and the positioning wheel are releasably engaged by a retaining disc.

In an example embodiment, a sleever bar mount for attachment to a tool belt is disclosed. The example sleever bar mount includes a tool holder and configured to receive the sleever bar, and a positioning wheel including a plurality of positioning pockets formed in a circumferential surface of the positioning wheel, wherein the positioning wheel is fixed coupled to the tool holder. The example sleeve bar mount further includes a locking lever handle having a pair of engagement mechanisms arranged to engage two of the plurality of positioning pockets formed within the positioning wheel when the locking lever is deployed in a locked state.

In another example embodiment, a positionable tool mount is disclosed. The positionable tool mount includes a lock handle slidably secured to a mounting plate, wherein the lock handle is movable between a secured position and a locked position, and a positioning wheel having a plurality of positioning pockets formed along a circumferential surface of the positioning wheel, wherein the positioning wheel is rotatable about a centerline and coupled to the mounting plate such that the lock handle engages the gear positioning wheel in the locked position. The example positionable tool mount further includes a tool holder including a pigtail arranged to accept a sleever bar, wherein the tool holder is fixedly coupled to the positioning wheel.

In another example embodiment, a tool mount for use with a sleever bar is disclosed. The example tool mount includes a positioning wheel rotationally coupled about a centerline to a mounting plate, wherein the positioning wheel includes a plurality of engagement features included in a circumference surface of the positioning wheel, and a tool holder having a first end fixedly coupled to the positioning wheel along the centerline and a pigtail sized to accept a sleever bar provided at a second end. The example tool mount further includes a lock handle having a pair of locking projections, wherein the lock handle is slidably secured to the mounting plate and movable between a secured position and a locked position, and wherein the pair of locking projections are positioned to engage two of the plurality of engagement features when the lock handle is in the locked position.

It should be understood that the inventive concepts disclosed herein do not require each of the features discussed above, may include any combination of the features discussed, and may include features not specifically discussed above.

BRIEF DESCRIPTION OF THE DRAWINGS

The drawings are schematic and not necessarily to scale. In the drawings, similar symbols typically identify similar components, unless context dictates otherwise.

DETAILED DESCRIPTION

Embodiments described herein relate to a tool holder configured to securely engage and support a tool, such as a sleever bar, while allowing for a full range of user-motion and custom tool positioning based on a particular application and/or user requirements.

I. INTRODUCTION

Figure 1:
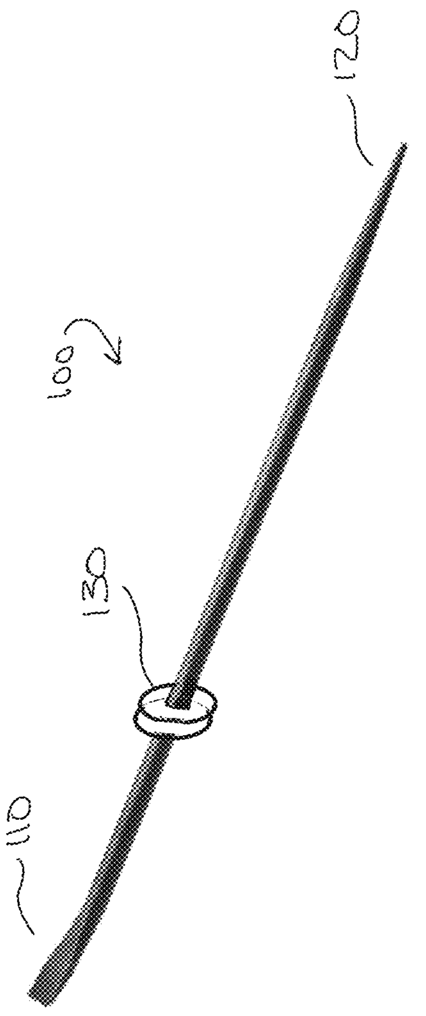
FIG. 1 illustrates an example of a sleever bar.

FIG. 1. illustrates an example of a sleever bar 100 that may be utilized by ironworkers to align and position one or more structural steel members during the assembly and construction of a steel structure. The example sleever bar 100 is an elongated bar made of steel. The example sleever bar 100 may be formed with a variety of cross-sections such as an octagonal cross-section, a square cross-section, and a round cross-section. In other examples, the sleever bar 100 includes an external finish or treatment such a knurling to increase or promote a solid user grip. In yet other examples, the sleever bar 100 is hardened to prevent damage and/or coated to increase durability, prevent sparks and otherwise protect the material of the sleever bar 100.

The sleever bar 100 may be used to provide leverage during the alignment and positioning of one structural steel member relative to another structural steel member prior to joining. For example, the sleever bar 100 includes a chisel end 110 to position structural steel members. The sleever bar 100 further includes a taper or point 120 to facilitate aligning holes and maintaining relative positions between structural steel members. In some example embodiments, the sleever bar 100 is fitted with a collar 130 such as a locking ring to allow the elongated bar to be secured. As shown, for example in FIG. 1, the collar 130 is positioned along the length of the elongated bar. Because the inside diameter of the collar 130 is sized to cooperate with the outside diameter of a portion of the sleever bar 100, the collar 130 limits how far the sleever bar 100 will slide into a tool holder. For example, the collar 130 may be a two-piece collar sized to encircle the elongated bar of the sleever 100. The collar 130 may be sized to mechanically engaged the outside diameter of the elongated bar of the sleever 100. The collar 130 may include a set screw, a knob, or other mechanical means to engage and secure to the outside diameter of the elongated bar of the sleever 100.

The present disclosure describes example embodiments for a tool holder. In particular, the example embodiments describe an example tool holder for use with the sleever bar 100 or any other elongated tool. For example, the example disclosure describes a tool holder that operates in a fixed mode and an unlocked mode. The example tool holder described in the present disclosure secures a tool in a fixed or locked position relative to the user when operating in the fixed mode. Similarly, the tool holder described in the present disclosure allows the tool held within the tool holder to rotate freely relative to the user when operating in the unlocked mode. Additionally, when the tool holder is operating within the fixed mode, the tool can be rotatably positioned relatively to the user before being secured in the fixed mode.

II. EXAMPLE TOOL MOUNT FOR A SLEEVER BAR

Figure 2:
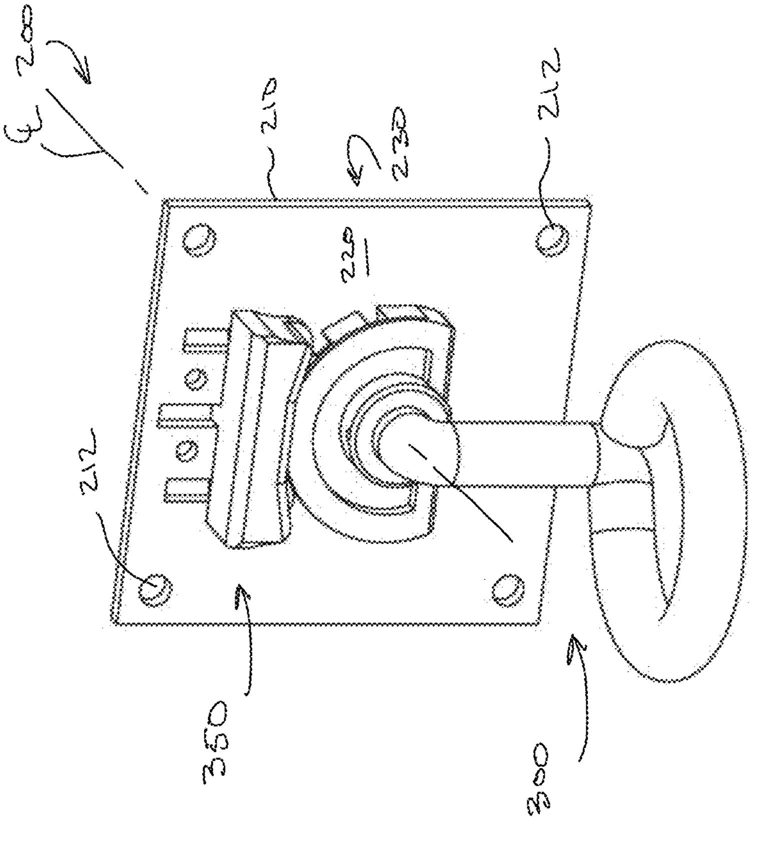
FIG. 2 illustrates a perspective view of a tool mount in accordance with an example embodiment.

FIG. 2 illustrates an example of a tool mount 200 configured to engage and support an elongated tool such as the sleever bar 100. The example tool mount 200 includes a tool holder assembly 300 held in a fixed position by a locking assembly 350. Further, the tool mount 200 includes a mounting plate 210 arranged to carry the tool holder assembly 300 and the locking assembly 350 adjacent to a front face 220. The tool holder assembly 300 and the locking assembly 350 are secured through the mounting plate 210 relative to a back face 230. The mounting plate 210 includes a plurality of attachment holes 212 positioned at each corner of the rectangular shaped plate to accept an attachment screw or rivet. In some example embodiments, the plurality of attachment holes 212 are replaced by attachment features such as a belt clip secured to the back face 230 or one or more belt loops or hooks formed as part of the mounting plate 210.

Figure 9:
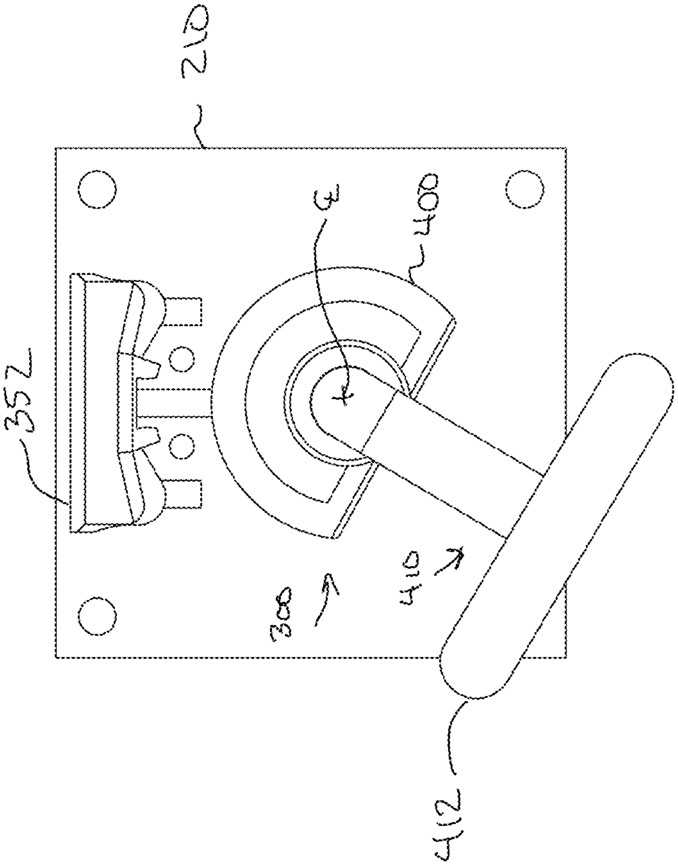
FIG. 9 illustrates a front view of the tool mount of FIG. 2, where the locking handle is secured away from the positioning wheel.

In the example embodiment shown in FIG. 2, the locking assembly 350 is secured to the front face 220 of the mounting plate 210 and engaged with the tool holder assembly 300. As shown in FIG. 2, the tool holder assembly 300 is secured in a fixed position relative to the mounting plate 210 and rotation around the centerline CL is prevented by engagement of the locking assembly 350 with the tool holder assembly 300. The illustrated arrangement reflects an example of the tool mount 200 in fixed or locked mode where the tool holder assembly 300 is configured to receive the sleever bar 100 and maintain the alignment of the elongated body relative to the mounting plate 210. As best seen in FIG. 9, the tool mount 200 is configured in a free or unlocked mode where the tool holder assembly 300 is configured to receive the sleever bar 100 rotate freely about the centerline CL relative to the mounting plate 210 with the locking assembly 350 disengaged from the tool holder assembly 300.

Figure 3A:
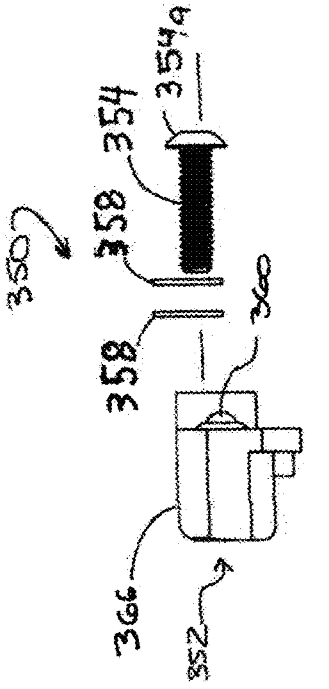
FIG. 3*a* illustrates an exploded side view of the locking assembly shown in FIG. 3.
Figure 3:
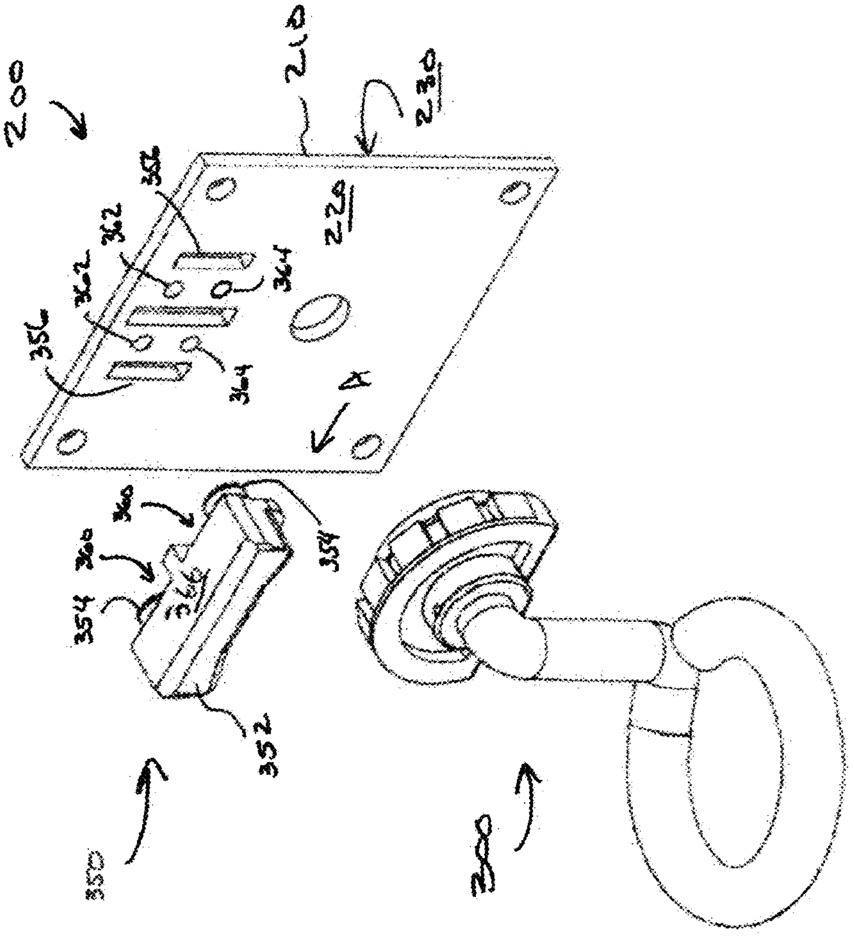
FIG. 3 illustrates an exploded, perspective view of a locking assembly and rotatable tool holder assembly of the tool mount shown in FIG. 2.

FIG. 3 illustrates an exploded view of the example tool mount 200 including the tool holder assembly 300 aligned relative to the locking assembly 350 and the mounting plate 210. In this example embodiment, the locking assembly 350 includes handle 352 and fasteners 354 arranged to align with linear slots 356 formed through the mounting plate 210. For example, as illustrated in FIG. 3*a* which is a side view of the locking assembly 350 viewed from the direction indicated by arrow A, the fasteners 354 are threaded fasteners such as a screw or bolt sized to engage a corresponding drilled and tapped hole provided in the handle 352. In practice, each of the fasteners 354 pass through one of the linear slots 356 to engage the handle 352 such that a head 354*a* contacts with the back surface 230 of the mounting plate 210 (see FIG. 5). As the fasteners 354 engage the handle 352, the entire locking assembly 350 is drawn towards the front surface 220 of the mounting plate 210. In one example, the fasteners 354 are button head screws sized to extend through the linear slots 356 formed through the mounting plate 210 to engage a tapped and threaded hole formed in the handle 352. In another example, the fasteners 354 are a shoulder screw having a shoulder of sufficient width to slidably extend through the linear slots 356 to engage the tapped and threaded hole formed in the handle 352. In another example, the fasteners 354 are rivets driven through the mounting plate 210 to engage the handle 352. In another example, the fasteners 354 are studs extending from handle 352 through the linear slots 356 and secured adjacent to the mounting plate 210. In the illustrated example, the locking assembly 350 further utilizes washers 358 adjacent to the front surface 220 and the back surface 230 held between the handle 352 and the fastener 354. The washers 358 positioned adjacent to either face of the mounting plate 210 ensure smooth and translatable contact between the fastener 354, the handle 352, and the mounting plate 210. The washers 358 additionally act as a spacer to ensure correct spacing and distance between the components of the locking assembly 350 and the mounting plate 210. The spacers may further be selected to allow non-binding or lower friction movement between the components of the locking assembly 350 and the mounting plate 210.

The locking assembly 350 further includes one or more ball detents carried within the handle 352 and arranged to engage the front face 220 of the mounting plate 210 when assembled as shown in FIG. 2. For example, as shown in FIGS. 3 and 3*a*, the handle 352 includes a pair of the ball detents 360 biased by springs to deformably engage the front face 220 of the mounting plate 210 when the fasteners 354 mechanically engage the handle 352 through the linear slots 356 of the mounting plate 210. In the illustrated configuration, the pair of the ball detents 360 is positioned within the handle 352 and arranged to align with a first pair of stops 362 and a second pair of stops 364. In practice, the fasteners 354, when positioned within the linear slots 356 and secured to the handle 352, draw the inner surface of the handle 352 towards the front face 220 of the mounting plate 210. The action of the fasteners 354 tightening to secure the handle 352 to the mounting plate 210 results in the compression of the ball bearing portion of each of the ball detents 360 against the front face 220.

Each ball detent 360 is positioned and arranged within the handle 352 in order to allow it to align with one of the corresponding pair of stops 362, 364. In the illustrated configuration, the first pair of stops 362 collectively reflect a secured position with respect to the handle 352. For example, when the handle 352 is in the secured position, each of the ball bearings making up the ball detents 360 carried within the handle 352 are extended by spring-action into the one of the corresponding pair of stops 362. In the secured position, the locking assembly 350 is stored in position away from the tool holder assembly 300. Similarly, the second pair of stop 364 collectively reflect a locked position with respect to the handle 352. For example, when the handle 352 is in the locked position, each of the ball bearings making up the ball detents 360 carried within the handle 352 are extended by spring-action into the one of the corresponding pair of stops 364. In the locked position, the locking assembly 350 is held in position adjacent to the tool holder assembly 300. In one example embodiment, the stops 362 and 364 are a recess or dimple provided in the front face 220 of the mounting plate 210. In another example embodiment, the stops 362 and 364 are through holes drilled into the mounting plate 210, or a raised ridge provided on the front surface 220 of the mounting plate 210. The cooperation of the ball detents 360 and the stops 362 and 364 provide a retention assembly to ensure the handle 352 remains in a desired position.

In operation, when a force is applied to the handle 352 resting in the locked position, each of the ball bearings included in the ball detents 360 are dislodged from their position within one of the corresponding stops 364. The applied force results in the translation of the handle 352 along the linear slots 356 as guided by the fasteners 354. Translation along the linear slots 356 continues until the handle 352 is adjacent to the secure position. When the handle 352 translated to a location on the front face 220 adjacent to the secure position, the ball bearings of each of the ball detents 360 aligns with one of the pair of stops 362. Alignment between the ball detent 360 and the corresponding stops 362 allows the ball bearing and spring portion of the detent to decompress such that the ball is contained by and secured within the one of the stops 362.

The handle 352 is manufactured from, for example, a milling process, a molding process, an additive manufacturing process, and/or any combination of these example processes. For example, in one embodiment, the handle 352 is machined, milled, or otherwise manufactured from a steel blank. In some embodiments, when the sleever bar mount 200 is secured to the belt of a standing user, a substantially flat surface 366 is oriented to the user and substantially aligned parallel to the ground. In other embodiments, the handle 352 is a knob of other feature that may be grasped and to which a force is applied. Thus, when a user provides a force, e.g., pushes down, on the knob or flat surface of the handle 352, the handle 352 is moved or translated to engage with the tool holder assembly 300. The force provides the mechanical engagement that results in the tool mount 200 being secured in fixed mode. Similarly, if the user pulls against the handle 352, the handle 352 is moved or translated to disengage or release from with the tool holder assembly 300 allowing free motion while the handle 352 is in the secured mode and cooperating with the pair of stops 362.

Figure 4A:
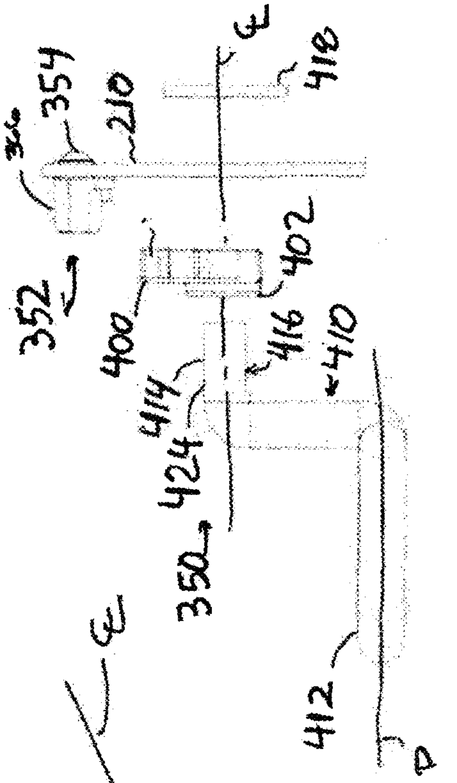
FIG. 4*a* illustrates a side view of the exploded tool holder assembly shown in FIG. 4.
Figure 4:
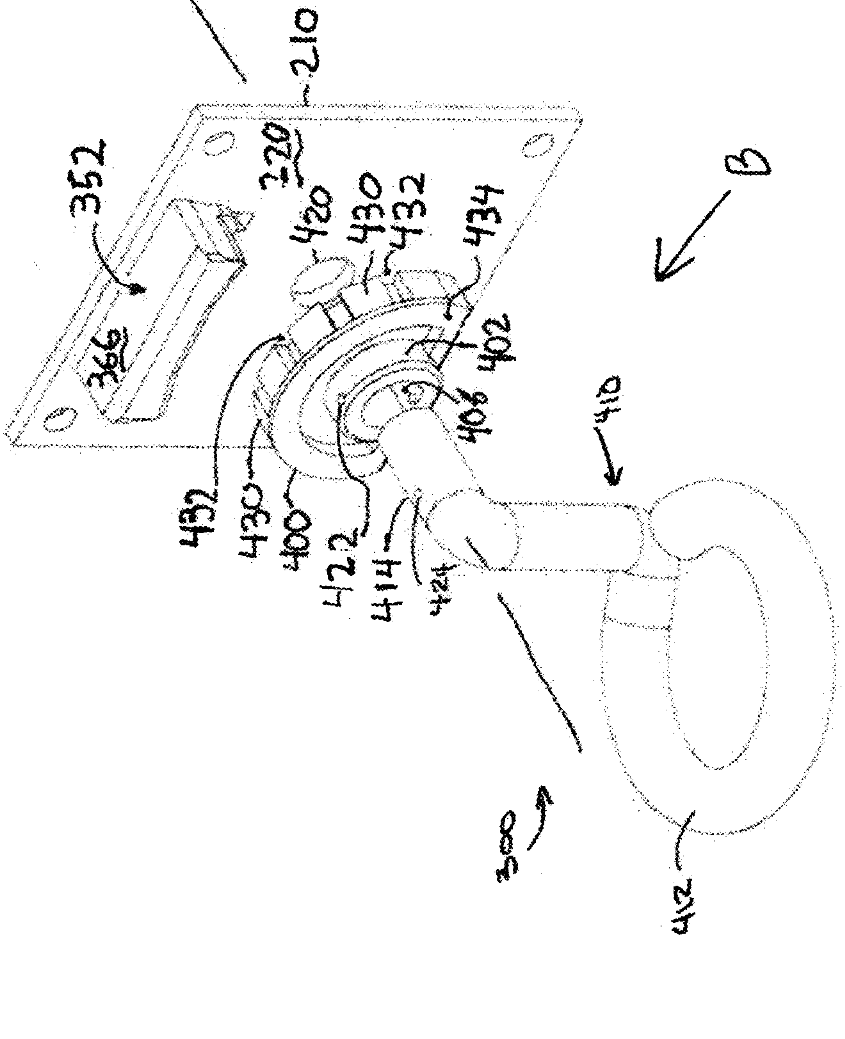
FIG. 4 illustrates an exploded, perspective view of the locking assembly and rotatable tool holder assembly shown in FIG. 3, showing the rotatable tool holder assembly in greater detail.

FIG. 4 illustrates another view of the tool mount 200 shown in FIG. 3. In particular, FIG. 4 illustrates an exploded view of the tool holder assembly 300 aligned with the mounting plate 210. In the illustrated example, the handle 352 is deployed in the secure location where the ball detents 360 (see FIG. 3*a*) are mechanically engaged with the pair of stops 362. For example, the tool holder assembly 300 is aligned with a cylindrical through-hole 420 centered on a centerline CL formed in the front face 220 of the mounting plate 210.

The tool holder assembly 300 includes a tool holder 410 fixedly coupled to a positioning wheel 400 for movement therewith. The tool holder 410 includes a loop 412 or pigtail sized to accept the sleever bar 100. For example, a ring or removable collar affixed to the external surface of the sleever bar 100 engages the loop 412. In practice, the loop 412 defines a plane P (see FIG. 4*a*) aligned substantially perpendicular to the front face 220 of the mounting plate 210. FIG. 4*a* is a side view of the tool holder assembly shown in FIG. 4 taken from the direction of arrow B. The alignment of the loop 412 is arranged to hold the sleever bar 100 such that elongated body is substantially parallel to the body of the user when the tool mount 200 is affixed to a belt or other material. In one example embodiment, the tool holder 410 is formed from cylindrical bar stock in, for example, a hot roll forming process. In another example embodiment, the tool holder 410 is stamped or a formed metal L-bracket including a first arm including an opening sized to received the sleever bar 100. The second, and opposing, arm of the L-bracket may be configured to engage with the positioning wheel 400.

In the illustrated example, the tool holder 410 and loop 412 are formed to include a base 414 configured to fixedly couple with the positioning wheel 400. For example, the base 414 is formed or machined to include a flat 416. The positioning wheel 400 includes a coupler 402 formed to include a corresponding flat 406. When the tool holder 410 and the positioning wheel 400 are coupled, the corresponding flats 406, 416 are aligned and prevent relative rotation therebetween. The base 414 carrying the secured and aligned positioning wheel 400 may extend into and beyond the through-hole 420 to the back surface 230 (see FIG. 5).

Figure 5:
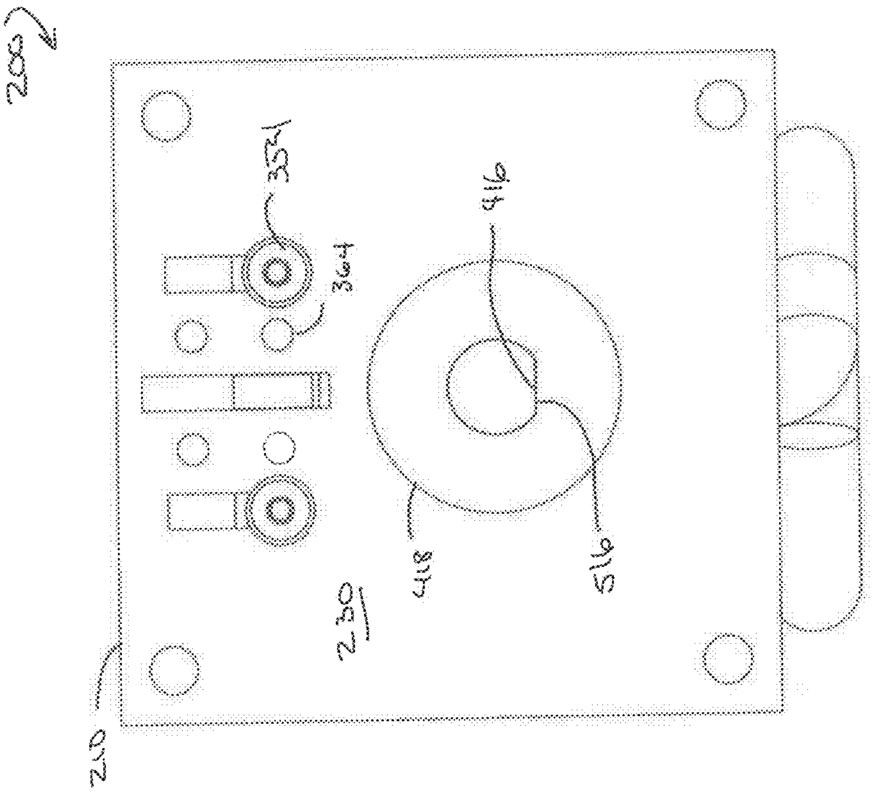
FIG. 5 illustrates a rear view of a mounting plate of the tool mount shown in FIG. 2.

FIG. 5 is a rear view of the tool holder 200 showing the back surface 230 of the mounting plate 210. A retaining disc 418 is coupled to the base 414 to secure the hold the positioning wheel 400 substantially adjacent to the front face 220 of the mounting plate 210. In this way, the tool holder assembly 300 including the positioning wheel 400 and tool holder 410 are coupled to the mounting plate 210 while allowing for rotation about the centerline CL. As shown in FIG. 5, the retaining disc 418 includes a complimentary flat 516 arranged to engage and secure the flat 406 formed as part of the base 414. In one example embodiment, the retaining disc 418 and base 414 are attached to each other as a result of spot welding but could be bonded using a suitable bonding material or compound. In another, example embodiment, a threaded hole is formed at the end of the base 414, and a threaded fastener and washer secure the disc 418 to the base 414. In another example embodiment, the base 414 and the coupler 402 are pinned together via a pin-hole 422 provided in the positioning wheel 400 and a corresponding clearance-hole 424 provided through the base 414.

Figure 6:
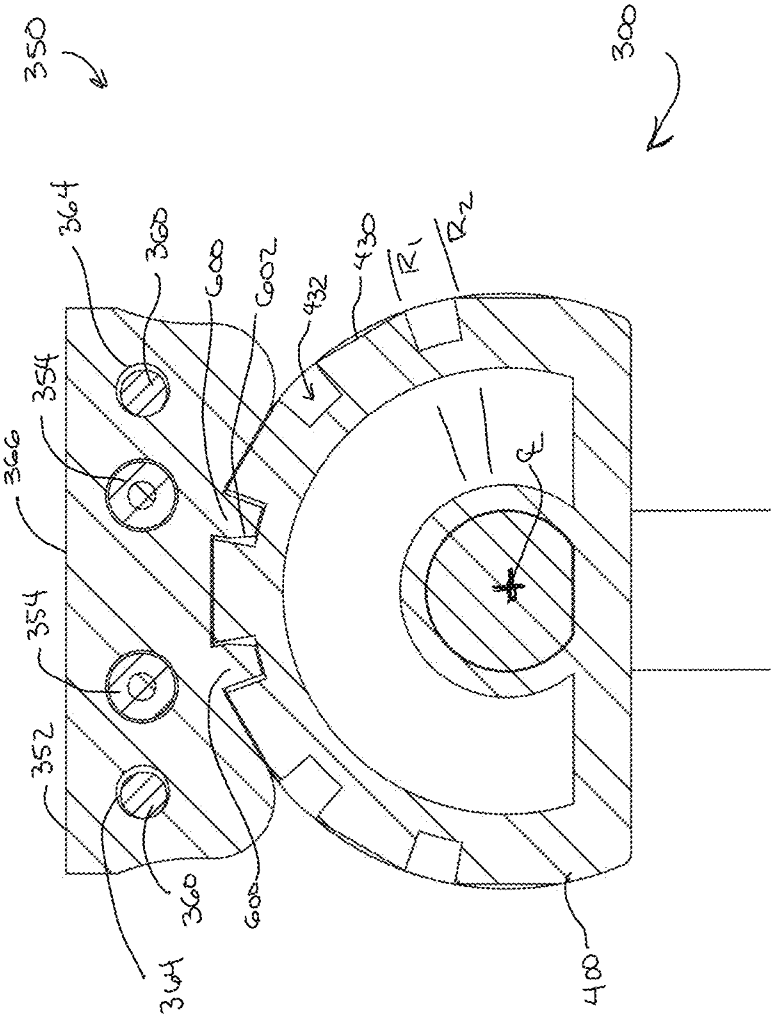
FIG. 6 illustrates a sectional view of a mechanical engagement between the locking assembly and positioning wheel of FIG. 3.
Figure 7:
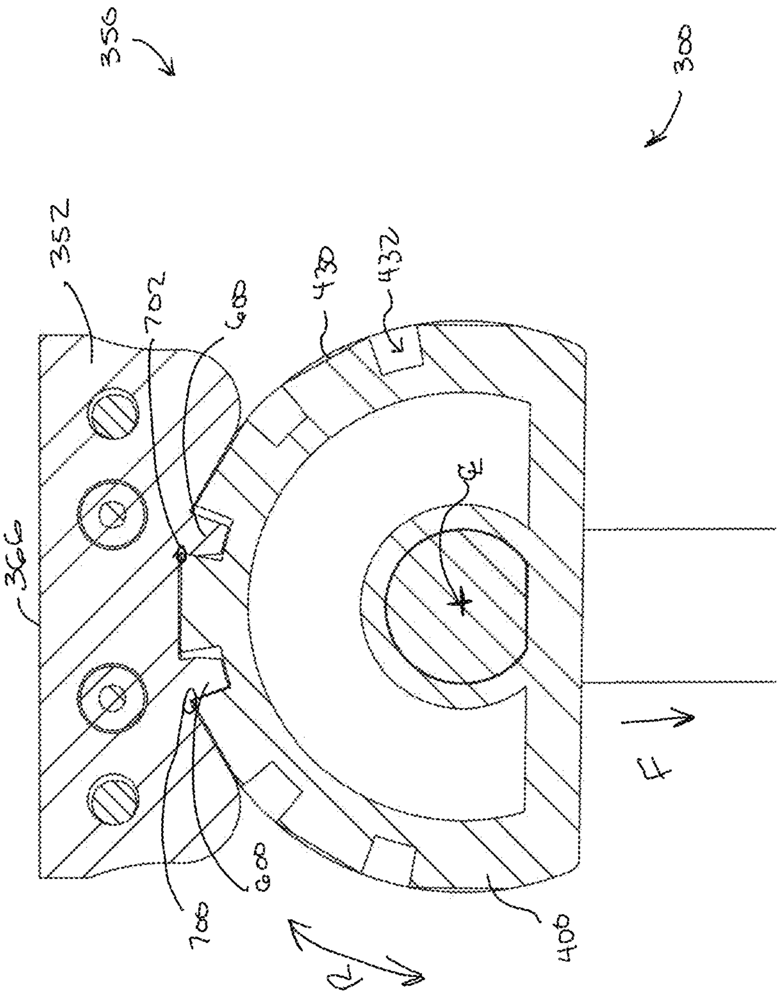
FIG. 7 illustrates the operation of the mechanical engagement between the locking assembly and positioning wheel shown in FIG. 6.

FIG. 4, and FIGS. 6 and 7 illustrate that the positioning wheel 400 is a disk or a cam rotatable about the centerline CL relative to the mounting plate 210. The disk defining the positioning wheel 400 includes a circumference surface 430 and a plurality of engagement features 432 formed therein. In one example embodiment, the plurality of engagement features 432 are evenly spaced about the circumference surface 430. In one example embodiment, each of the engagement features 432 are an opening defined between equally spaced radial lines such as radial $R_1$ and radial $R_2$ shown extending from the centerline CL in FIG. 6. In another example embodiment, each of the engagement features 432 is a slot or groove provided within the circumference surface 430. In another example embodiment, each of the engagement features 432 is a cog or a tooth having, for example, an involute gear profile. In this example embodiment, the teeth making up the plurality of engagement features 432 of the positioning wheel 400 cooperate to collectively define a gear. In another embodiment, the engagement features 432 are positioned at zero (0) degrees, sixty (60) degrees, and a hundred (100) degrees along the positioning wheel 400.

FIG. 4 further illustrates an exploded view of components included as part of the tool holder assembly 300 as they are aligned with the mounting plate 210. The example tool holder assembly 350 shown in FIG. 4 includes the positioning wheel 400 formed to include a cover 434 arranged to protect the positioning wheel 400. For example, the plurality of engagement features 432 formed as part the positioning wheel 400 are protected by the cover 434 arranged to close one end of the engagement features 432 and protect against debris or other contamination. In one example embodiment, the cover 434 further incorporates the coupler 402 providing a snag-free transition between the base 414 and the plurality of engagement features 432. In one example embodiment, the cover 434 includes or cooperates with at least one guard extending away from front face 220 to cover at least a portion of the circumference surface 430.

FIG. 5 illustrates a rear view of the mounting plate 210 including the base 400 cooperating with the positioning wheel 400. As discussed above, the retaining disc 418 is positioned to engage the base 414 in rotatable contact relative to the mounting plate 210. The portion of the base 414 extending through the mounting plate 210 may be engaged and secured by the retaining disc 418. For example, when the complimentary flat 516 formed as part of the retaining disc 418 is aligned with the flat 406 formed as part of the base 414, the two components are press fit or otherwise mechanically joined together. The mechanical connection between the retaining disc 418 and the base 414 secures the tool holder assembly 300 to the mounting plate 210 while maintaining relative alignment with the tool holder 412 and the positioning wheel 400.

FIGS. 6 and 7 illustrate the handle 352 aligned in cooperation with the positioning wheel 400. For example, as shown in FIG. 2, when the ball detents 360 of the locking assembly 350 are cooperating with the pair of stops 364 corresponding to the locked position, the tool holder assembly 300 is held in a locked or fixed position relative to the mounting plate 210.

FIG. 6 illustrates a cross-sectional view of the handle 352 mechanically engaged with the positioning wheel 400. In particular, the locking handle 352 is positioned in the locked position such that a pair of locking tabs 600 arranged to engage two of the plurality of engagement features 432 formed around the circumference surface 430. In other embodiments, a single locking tab 600 is employed to engage one of the plurality of engagement features 432. In another example embodiment, a plurality of locking tabs is configured to engage the plurality of engagement features 432. Specifically, when the handle 352 translates along the linear slots 356 towards the stops 364, the pair of locking tabs 600 passes through a plane defined by the circumference surface 430 and enters two of the corresponding the engagement features 432. For example, the engagement features 432 are enlarged relative to the locking tabs 600 to allow for easy mechanical coupling. In one example embodiment, the locking tabs 600 include a taper or a relief 602 allowing for a slight rotational misalignment between the positioning wheel 400 and the handle 352 to be corrected as the locking tabs 600 enter and mechanically align with the engagement features 432.

In one example embodiment, the locking tabs 600 are teeth sized to cooperate with the engagement features 432. For example, if the engagement features 432 are configured as teeth in a gear, the locking tabs 600 smoothly engage to mechanically prevent rotation of the positioning wheel 400. In another example, the locking tabs 600 are configured as pins sized to cooperate with engagement features 432 configured or machines as slots or pockets within the circumference surface 430. In this example configuration, the positioning wheel 400 is prevented from rotating freely and further secured adjacent to the mounting plate 210. In operation, any two adjacent engagement features 432 can be engaged with the locking tabs 600 to lock the positioning wheel 400 at a desired rotated position about the centerline CL. This allows the sleever to be held at a desired angle relative to the tool mount 200.

FIG. 7 illustrates the handle 352 mechanically engaged with the positioning wheel 400 and under a load F such as provided by the sleever bar 100 being carried within the loop 412. For example, the load F is imparted when the weight of the sleever bar 100 is supported within the loop 412. The load F results in a rotational force R being transferred from the loop 412 to the positioning wheel 400 causing the locking tabs 600 to bind with the corresponding engagement features 432. For example, contact points 700 and 702 reflect the locations at which the engagement features 432 come into direct contact with the locking tabs 600. The resulting mechanical engagement between the components further serves to lock the tool holder assembly 300 relative to the handle 352.

Figure 8:
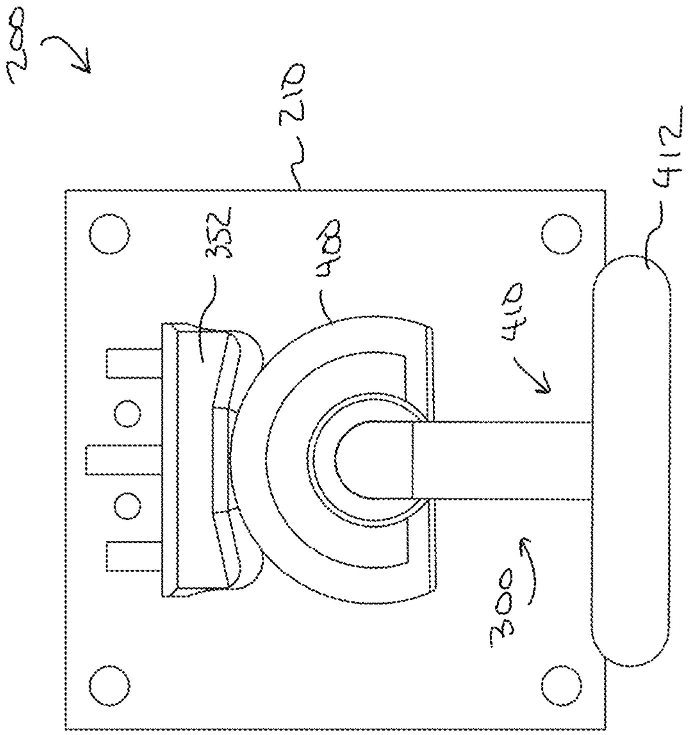
FIG. 8 illustrates a front view of the tool mount of FIG. 2, where a locking handle engages the positioning wheel.

FIGS. 8 and 9 illustrate the tool mount 200 configured in a locked mode, and in a secured mode, respectively. FIG. 8 illustrates the tool mount 200 where the locking assembly 350 mechanically engages the tool holder assembly 300 in the locked position. The tool holder assembly 220 may be arranged to receive the sleever bar 100 within the pigtail 412 of the tool holder 410. In the locked position the sleever bar 100 may be held in a fixed position relative to the user's body and the mounting plate 210. FIG. 9 illustrates the tool mount 200 after the locking handle 220 has been translated along the linear slots 356 away from the positioning wheel 400. In particular, the locking handle 220 is shown in the secured position where ball detents 320 are secured within pair of stop 362 collectively defined as the secured location. In this configuration the pigtail 352 is allowed to rotate freely about the centerline CL along with the positioning wheel 400.

Figure 11:
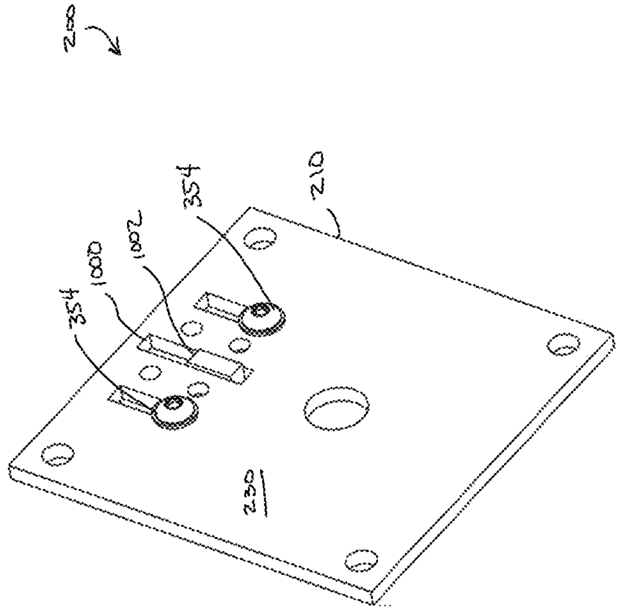
FIG. 11 illustrates a rear, perspective view of the tool mount shown in FIG. 10.
Figure 10:
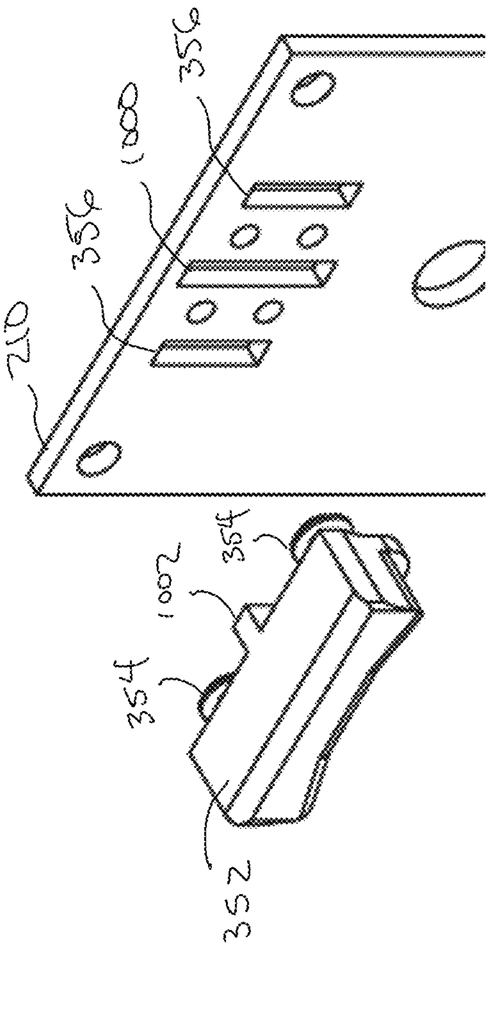
FIG. 10 illustrates a perspective view of another example embodiment of a tool mount according to this disclosure, where a locking handle is configured to engage a mounting plate and positioning wheel.

FIGS. 10 and 11 illustrate views of another example embodiment of the disclosed tool mount 200. In particular, the mounting plate 210 includes a guide slot 1000 sized to accept a guide 1002 formed as part of the handle 352. For example, when the handle 352 is secured adjacent to the front face 220 with the fasteners 354, the guide 1002 extends into the guide slot 1000. As illustrated, the guide slot 1000 is formed parallel to the linear slots 356 through which the handle 352 is configured to translate. As shown in FIG. 11, the guide 1002 has a substantially rectangular cross-section sized such that the long side walls of the guide 1002 slidably translate along the inner surface of the guide slot 1000. In practice, the rectangular cross-section, including the length of the long side walls of the guide 1002, cooperate with the inner walls of the guide slot 1000 when a force is applied unevenly to handle 352 to prevent unwanted rotation of the locking assembly 350 as it translates between the locked position and the secured position. For example, when a force is applied to the handle 352 off-center relative to the linear slots 356, the handle 253 rotates and become lodged, or difficult to move within due to a mechanical binding relative to the linear slots 356. The addition of the guide 1002 minimizes the allowed rotation that may be imparted upon the handle 352 relative to the linear slots 356. In some example embodiments, the guide 1002 includes a head that extends through and engages the back surface 230 of the mounting plate 210. In another example embodiment, the guide 1002 includes two or more linearly pins arranged to extend into the guide slot 1000. The example pins may be linearly aligned in direction parallel to the direction of translation and/or travel as limited by the linear slots 356.

In an example embodiment, a sleever bar mount for attachment to a tool belt is disclosed. The example sleever bar mount includes a tool holder and configured to receive the elongated steel body of the sleever bar used to manipulate structural ironwork. The sleever bar mount additionally includes a positioning wheel including a plurality of positioning pockets formed in a circumferential surface of the positioning wheel. The positioning pockets may be teeth and the positioning wheel may be configured as a gear sized to cooperate with the teeth. When assembled, the positioning wheel may be fixedly coupled to the tool holder. The example sleever bar mount further includes a locking handle having a pair of locking fingers arranged to engage two of the plurality of positioning pockets formed within the positioning wheel when the locking lever is deployed in a locked position. The locking handle may be translated between being securely held at the locked position and being securely held at the secured position.

In another example embodiment, a positionable tool mount is disclosed. The positionable tool mount includes a locking handle attached to a mounting plate and configured to linearly slide related to a surface of the mounting plate. The locking handle may be movable between a secured position and a locked position defined as part of the mounting plate. The positionable tool mount may further include a wheel having a plurality of pockets formed along a circumferential surface of the wheel. The wheel may be a full circular disc or a partial circular arc depending on the desired range of travel. In operation, the wheel may be rotated about a centerline relative to the mounting plate to which it is affixed. The wheel may be positioned on the mounting plate such that the locking handle engages the wheel when held in the locked position. The example positionable tool mount further includes a tool holder including a pigtail arranged to accept a sleever bar, wherein the tool holder is fixedly coupled to the wheel.

In another example embodiment, a method for securing a sleever bar is disclosed. The example method includes receiving the sleever bar within a pigtail of a tool holder. The tool holder supporting the sleever bar may be fixedly secured to a rotatable positioning wheel including a plurality of engagement features. The plurality of engagement features may be teeth and the positioning wheel may be configured as a gear. The example method further includes translating a locking handle from a secured location to a locked location. The example step of translating to the locked location further includes engaging a retainer at the locked location to secure the locking handle in the locked location. The example method further includes engaging a pair of locking projections of the secured locking handle with two of the plurality of engagement features formed as part of the rotatable positioning wheel, wherein the engaged locking projections and secured lock handle retain the tool holder in a fixed position. The example method further includes translating the locking handle to a secured location, wherein the pair of locking projections disengage from the plurality of engagement features allowing free rotation of the positioning wheel.

IV. CONCLUSION

Preferred embodiments of the inventive concepts are described herein, including the best mode known to the inventor(s) for carrying out the inventive concepts. Variations of those preferred embodiments will become apparent to those of ordinary skill in the art upon reading the foregoing description. The inventor(s) expect skilled artisans to employ such variations as appropriate, and the inventor(s) intend that the inventive concepts can be practiced otherwise than as specifically described herein.

The use of the term “substantially” in the context of describing the invention (especially in the context of the following claims) may be construed as not exactly. The term “substantially” may indicate deviations from exact, such as intentional and/or unintentional deviations (e.g., manufacturing tolerances). In some examples, “substantially” may indicate one standard deviation from exactly, or two standard deviations from exactly. For example, “substantially” may mean a deviation from exactly between 0 and 10 percent, between 10 and 20 percent, between 30 and 40 percent, or between 40 and 50 percent. In other examples, “substantially” may mean a deviation from exactly between 0 and 10 degrees, between 10 and 20 degrees, between 20 and 30 degrees, between 30 and 40 degrees, or between 40 and 50 degrees.

The use of the terms “a” and “an” and “the” and “at least one” and similar referents in the context of describing the invention (especially in the context of the following claims) are to be construed to cover both the singular and the plural, unless otherwise indicated herein or clearly contradicted by context. The use of the term “at least one” followed by a list of one or more items (for example, “at least one of A and B”) is to be construed to mean one item selected from the listed items (A or B) or any combination of two or more of the listed items (A and B), unless otherwise indicated herein or clearly contradicted by context. The terms “comprising,” “having,” “including,” and “containing” are to be construed as open-ended terms (i.e., meaning “including, but not limited to,”) unless otherwise noted. The use of any and all examples, or exemplary language (e.g., “such as”) provided herein, is intended merely to better illuminate the inventive concepts disclosed herein and does not pose a limitation on the scope of any invention unless expressly claimed. No language in the specification should be construed as indicating any non-claimed element as essential to the practice of the inventive concepts disclosed herein.

What is claimed is:

1. A tool mount for use with a sleever bar, the tool mount comprising:

a mounting plate comprising a plurality of vertical slots;

a locking handle linearly slideable upon the mounting plate and guided via the plurality of vertical slots between a secured position and a locked position, the locking handle including a retention assembly for being releasably retained in both the secured position and the locked position;

a positioning wheel rotatably mounted to the mount plate and aligned adjacent to the locking handle, wherein the positioning wheel is configured to:

engage the locking handle when the locking handle is in the locked position; and rotate freely relative to the locking handle when the locking handle is in the secured position;

a tool holder coupled to the positioning wheel and configured to receive the sleever bar, wherein the tool holder rotates freely with the positioning wheel when the locking handle is in the secured position.

2. A tool mount for use with a sleever bar, the tool mount comprising:

a locking handle moveable between a secured position and a locked position;

a positioning wheel aligned adjacent to the locking handle, wherein the positioning wheel is configured to:

engage the locking handle when the locking handle is in the locked position; and rotate freely relative to the locking handle when the locking handle is in the secured position; and a tool holder coupled to the positioning wheel and configured to receive the sleever bar, wherein the tool holder rotates freely with the positioning wheel when the locking handle is in the secured position;

wherein the locking handle includes a retention assembly;

wherein the retention assembly is at least one ball detent;

wherein the at least one ball detent of the retention assembly is aligned with a corresponding stop formed into a mounting plate;

wherein the corresponding stop includes a first stop formed in the mounting plate and a second stop formed in the mounting plate; and wherein the second stop reflects the secured position corresponding to the positioning wheel being allowed to rotate freely about a centerline.

3. The tool mount of claim 2, wherein the locking handle includes a pair of locking tabs.

4. The tool mount of claim 3, wherein the positioning wheel includes a plurality of engagement features sized to accept the pair of locking tabs.

5. The tool mount of claim 2, wherein the at least one ball detent is located adjacent to the first stop corresponding to the positioning wheel in the locked position.

6. The tool mount of claim 2, wherein the tool holder is fixedly coupled to the positioning wheel.

7. The tool mount of claim 2, wherein the tool holder is removably coupled to the positioning wheel.

8. The tool mount of claim 2, wherein the tool holder includes a pigtail.

9. The tool mount of claim 2, wherein the positioning wheel includes a plurality of engagement features sized to accept a pair of locking tabs.

10. The tool mount of claim 2, wherein the positioning wheel aligned adjacent to the locking handle is fixedly coupled to the mounting plate.

11. The tool mount of claim 10, wherein the mounting plate is a belt mounting plate.

12. The tool mount of claim 2, wherein a centerline of rotation of the positioning wheel is aligned with a travel path defined between the secured position and the locked position.

13. A method for securing a sleever bar, the method comprising:

receiving the sleever bar within a pigtail of a tool holder, wherein the tool holder is fixedly secured to a rotatable positioning wheel including a plurality of engagement features, and wherein the tool holder and positioning wheel are rotatable about a centerline;

translating a locking handle to a locked location, wherein the step of translating to a locked location further includes:

engaging a stop at the locked location to secure the locking handle in the locked location; and engaging a pair of locking tabs formed as part of the locking handle with two of the plurality of engagement features provided by the positioning wheel, wherein the pair of locking tabs and the stop cooperate to retain the positioning wheel and tool holder in a fixed position; and translating the locking handle to a secured location wherein the pair of locking tabs are disengaged from the positioning wheel to allow free rotation of the positioning wheel about the centerline.

14. The method of claim 13, wherein engaging a stop includes engaging the stop with a ball detent.

15. The method of claim 13, wherein engaging the pair of locking tabs includes providing a relief on each of the locking tabs.

16. The method of claim 13, wherein the tool holder and the positioning wheel are releasably engaged by a retaining disc.

* * * * *